S. E. PARSLEY.
COTTON CHOPPER.
APPLICATION FILED SEPT. 7, 1911.
1,045,431.
Patented Nov. 26, 1912.
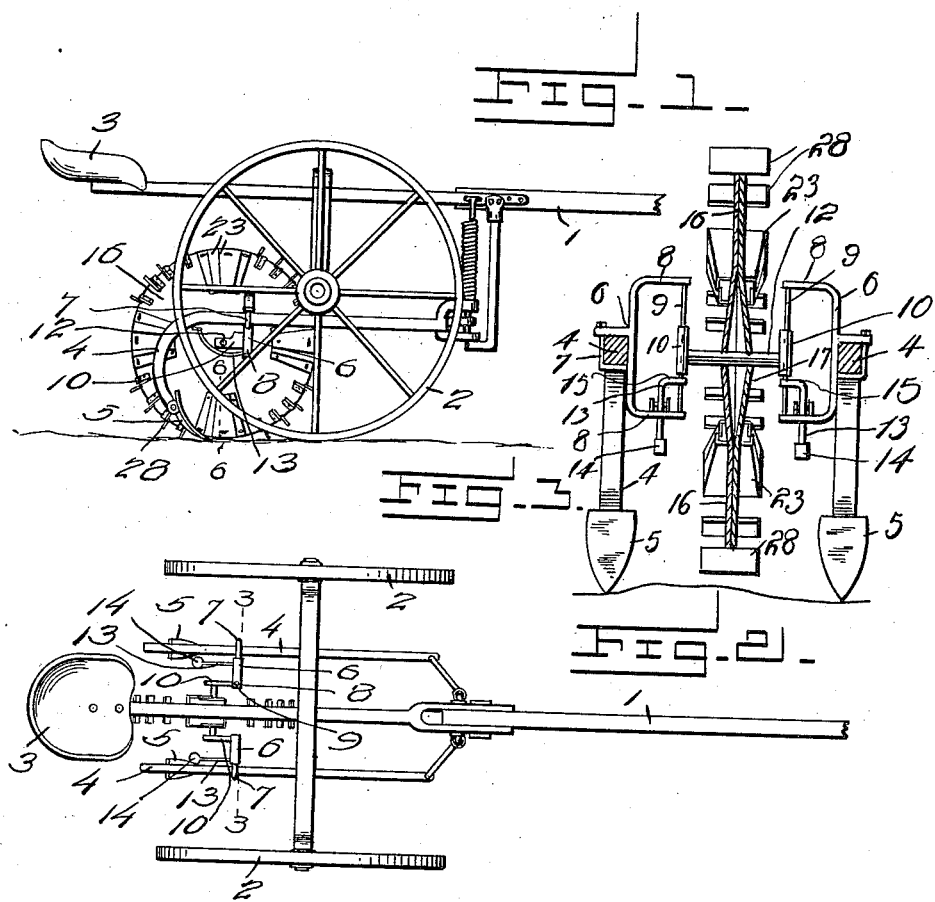
Witnesses
Inventor
S. E. Parsley,
By Harry Ellis Chandlee
Attorney

UNITED STATES PATENT OFFICE.

SAMUEL E. PARSLEY, OF LATEXO, TEXAS, ASSIGNOR OF ONE-HALF TO W. F. PAINE, OF WILLS POINT, TEXAS.

COTTON-CHOPPER.

1,045,431.   Specification of Letters Patent.   Patented Nov. 26, 1912.

Application filed September 7, 1911. Serial No. 648,085.

*To all whom it may concern:*

Be it known that I, SAMUEL E. PARSLEY, a citizen of the United States, residing at Latexo, in the county of Houston and State of Texas, have invented certain new and useful Improvements in Cotton-Choppers, of which the following is a specification.

My invention relates to improvements in cotton choppers, and has for its leading object the provision of an improved device of this character which may be readily attached to an ordinary cultivator and which will thus permit of both the cultivating and correct spacing of the plants in a single operation.

Other objects and advantages of my improved cotton chopper will be readily apparent by reference to the following description taken in connection with the accompanying drawings and it will be understood that I may make any modifications in the specific structure shown and described within the scope of my claims without departing from or exceeding the spirit of my invention.

Figure 1 represents a side elevation of a cultivator equipped with my improved cotton chopper. Fig. 2 represents a top plan view of the device as illustrated in Fig. 1. Fig. 3 represents a sectional view on the line 3—3 of Fig. 2 showing the chopper in raised position.

In the drawings, the numeral 1 designates the beams of an ordinary riding cultivator having the supporting wheels 2 and having mounted thereon the seat 3 for the driver of the cultivator. Said beams having depending therefrom the arms 4 for supporting the usual cultivator shares 5 which ride on opposite sides of the row of plants to be cultivated.

To enable me to protect certain of the plants in the row while destroying the others to insure proper spacing of the various plants, I secure to the cultivator beams 1 the clamps 6 fastened in place by the bolt locking members 7 and having the inwardly extending diverging yoke arms 8. A pivot bolt 9 extends vertically between and serves to connect the ends of the arms 8 of each yoke. Slidably engaged upon each of the bolts 9 is a bearing block 10 adapted to support the ends of the chopper shaft 12. A pedal lever 13 is intermediately pivoted to the lower arm of each of the yokes and has on one end the foot pedal 14 and on the other end a yoke 15 spanning the bolt 9, whereby pressure on the pedal 14 rocks the lever 13 to raise the bearing block and thus to vertically adjust the shaft of the cotton chopper 16. Said chopper comprises the pair of disks 16 having the outwardly bossed central portions 17 reinforced to form a bearing through which the shaft 12 passes, said disks having their outer portions bolted or secured together.

From the foregoing description taken in connection with the accompanying drawings, the construction and operation of my improved cotton chopping attachment for cultivators will be readily apparent and it will be seen that I have provided a simple and efficient device of this character which may be readily adjusted with reference to the ground by pressure upon the foot pedal and which will serve both to satisfactorily inclose and protect certain plants in a row from being covered by the cultivator shares and will also serve to chop and destroy the intermediate plants and to loosen the earth in the row intermediate the plants to be protected.

I claim:

The combination with the beams of a cultivator, of brackets secured thereto, vertical guides carried by the brackets, bearing blocks slidably mounted on the guides, levers pivoted to the brackets for controlling the sliding of the blocks on the guides, a shaft connecting the bearing blocks, and a chopper wheel rotatably mounted on the shaft.

In testimony whereof I affix my signature, in the presence of two witnesses.

SAMUEL E. PARSLEY.

Witnesses:
G. R. MURCHISON,
JNO. H. ELLIS.